United States Patent
Kawashima et al.

(10) Patent No.: US 12,351,006 B2
(45) Date of Patent: Jul. 8, 2025

(54) WINDOW GLASS FOR VEHICLE WITH NOISE REDUCTION

(71) Applicant: AGC Inc., Tokyo (JP)

(72) Inventors: Kunihiko Kawashima, Tokyo (JP); Shigemitsu Igei, Tokyo (JP)

(73) Assignee: AGC INC., Tokyo (JP)

( * ) Notice: Subject to any disclaimer, the term of this patent is extended or adjusted under 35 U.S.C. 154(b) by 313 days.

(21) Appl. No.: 17/835,749

(22) Filed: Jun. 8, 2022

(65) Prior Publication Data

US 2022/0410682 A1 Dec. 29, 2022

(30) Foreign Application Priority Data

Jun. 29, 2021 (JP) .................. 2021-107297

(51) Int. Cl.
*B60J 10/50* (2016.01)
*B60J 1/10* (2006.01)
*B60J 10/15* (2016.01)
*B60J 10/30* (2016.01)

(52) U.S. Cl.
CPC .............. *B60J 10/50* (2016.02); *B60J 1/10* (2013.01); *B60J 10/15* (2016.02); *B60J 10/30* (2016.02)

(58) Field of Classification Search
CPC ... B60J 10/50; B60J 10/15; B60J 10/30; B60J 1/10; B60J 10/72; B60J 5/0402; B60J 5/0406; B60J 5/0408; B60J 5/0411
USPC ...................................... 296/146.2
See application file for complete search history.

(56) References Cited

U.S. PATENT DOCUMENTS

| | | | | |
|---|---|---|---|---|
| 5,538,314 | A * | 7/1996 | Young | B60J 10/70 |
| | | | | 52/204.597 |
| 8,444,204 | B2 * | 5/2013 | Watou | B60J 10/70 |
| | | | | 156/244.18 |
| 2002/0046516 | A1 * | 4/2002 | Kato | B60J 1/10 |
| | | | | 52/204.53 |
| 2015/0017368 | A1 | 1/2015 | Kondou et al. | |
| 2015/0202948 | A1 * | 7/2015 | Saiki | B60J 10/70 |
| | | | | 49/502 |
| 2017/0100996 | A1 * | 4/2017 | Husek | B60R 13/0243 |
| 2018/0134125 | A1 * | 5/2018 | Takahashi | B60J 10/70 |
| 2020/0079197 | A1 * | 3/2020 | Yamada | B60J 10/75 |

FOREIGN PATENT DOCUMENTS

| | | |
|---|---|---|
| JP | 2006-160149 A | 6/2006 |
| JP | 2010-083397 A | 4/2010 |
| JP | 2012-131400 A | 7/2012 |

(Continued)

*Primary Examiner* — Amy R Weisberg
*Assistant Examiner* — Denise Lynne Esquivel
(74) *Attorney, Agent, or Firm* — Foley & Lardner LLP

(57) ABSTRACT

A window glass for a vehicle capable of suppressing, at a low cost, generation of an abnormal noise caused by entered wind. A window glass for a vehicle according to an aspect of the present disclosure is used for a fixed window of the vehicle and includes a glass plate and a molding made of a resin provided at a peripheral edge of the glass plate. In the molding, a molding lower part disposed on a lower side of the window glass for the vehicle is configured to be disposed on an inside of the door panel when the window glass for the vehicle is mounted to a door panel, and a plate-shaped member projecting toward an outside of the vehicle is provided at the molding lower part.

9 Claims, 11 Drawing Sheets

(56) References Cited

FOREIGN PATENT DOCUMENTS

| JP | 6120012 B2 | 4/2017 |
|---|---|---|
| WO | WO-2011/062143 A1 | 5/2011 |
| WO | WO-2013/151071 A1 | 10/2013 |
| WO | WO-2014/034220 A1 | 3/2014 |

* cited by examiner

WINDOW GLASS FOR VEHICLE WITH NOISE REDUCTION

INCORPORATION BY REFERENCE

This application is based upon and claims the benefit of priority from Japanese patent application No. 2021-107297, filed on Jun. 29, 2021, the disclosure of which is incorporated herein in its entirety by reference.

BACKGROUND

The present disclosure relates to a window glass for a vehicle, and more particularly to a window glass for a vehicle used for a fixed window of a vehicle.

A glass plate with a resin frame in which a molding (resin frame) made of a resin such as polyvinyl chloride or polyurethane is previously mounted to the glass plate has been commercialized as a product of a window glass for a vehicle shipped from a glass manufacturer. Such a glass plate with a resin frame is used for a fixed window such as a front quarter glass or a rear quarter glass of a vehicle. Such a glass plate with a resin frame is also referred to as MAW (Module Assy Window).

Japanese Unexamined Patent Application Publication No. 2010-83397 discloses a technique related to a window glass for a vehicle that enables repair of interior components thereof and processing to be performed from the outside of the vehicle. Japanese Patent No. 6120012 discloses a technique for manufacturing a glass plate with a resin frame.

SUMMARY

An issue to be solved by the present disclosure will be described with reference to FIGS. 9 to 11. FIG. 9 is a view for explaining the issue to be solved by the present disclosure, and is a side view of a vehicle (an automobile). FIGS. 10 and 11 are perspective views for explaining a window glass for a vehicle according to the related art. As shown in FIG. 9, a front door glass 106 and a front quarter glass 101 are provided for a door panel 105 of a vehicle 100. The front quarter glass 101 is a fixed window having a substantially triangular shape and fixed on a front side of the door panel 105. The front quarter glass 101 may be referred to as a front corner glass.

As shown in FIG. 10, the front quarter glass 101 (window glass for a vehicle) includes a glass plate 110 and a molding 111 made of a resin provided at a peripheral edge of the glass plate 110. The front quarter glass 101 is mounted to the door panel 105 with the resin molding 111 interposed therebetween. At this time, a lower molding part 113, which is disposed on a lower side of the window glass 101 for a vehicle, of the resin molding 111 is disposed inside the door panel 105.

When the front quarter glass 101 is mounted to the door panel 105, there may be a gap between the front quarter glass 101 and the door panel 105. In particular, when the gap is formed in a front part 118 of the front quarter glass 101, wind enters through the gap while the vehicle is traveling. As shown in FIG. 10, the entered wind passes through the molding lower part 113 on a lower side of the front quarter glass 101 and enters inside the door panel 105. Thus, when wind enters the inside of the door panel 105, there is a problem that an abnormal noise is generated due to the entered wind.

In the related art, in order to solve such a problem, as shown in FIG. 11, a damping member 115 for attenuating a flow of the wind is provided at the molding lower part 113 on the lower side of the front quarter glass 101. For example, an EPDM sealer (sponge) or the like has been used for the damping member 115. However, there is a problem that when such a damping member 115 is provided, the material cost of the damping member 115 is incurred and the number of steps necessary for mounting the damping member 115 to the molding lower part 113 is increased, thereby increasing the overall cost.

In view of the above problem, it is an object of the present disclosure to provide a window glass for a vehicle capable of suppressing, at a low cost, generation of an abnormal noise caused by wind entering a gap formed at a part where a glass plate with a resin frame is mounted to a door panel.

In an aspect of the present disclosure, a window glass for a vehicle is used for a fixed window of the vehicle and includes a glass plate and a molding made of a resin provided at a peripheral edge of the glass plate. In the molding, a molding lower part disposed on a lower side of the window glass for the vehicle is configured to be disposed on an inside of the door panel when the window glass for the vehicle is mounted to a door panel, and a plate-shaped member projecting toward an outside of the vehicle is provided at the molding lower part.

In the above window glass for a vehicle, the plate-shaped member may be provided in a hollow space between the molding lower part and an outer panel positioned on the outside of the door panel.

In the above window glass for a vehicle, a plurality of the plate-shaped members may be provided in the hollow space.

In the above window glass for a vehicle, from among the plurality of plate-shaped members, rigidity of the plate-shaped member positioned on a side closest to the front of the vehicle in a front-rear direction may be greater than rigidity of the plate-shaped member positioned on a rear side of the plate-shaped member positioned on the side closest to the front of the vehicle in the front-rear direction.

In the above window glass for a vehicle, the plate-shaped member may have a thickness of 0.5 mm to 8 mm.

In the above window glass for a vehicle, when the window glass for the vehicle is mounted to the door panel, the molding lower part may be mounted to the door panel with a belt molding attached to the door panel interposed therebetween, and the plate-shaped member may be configured to be spaced apart from a lower end of the belt molding in the vertical direction inside the door panel.

In the above window glass for a vehicle, when the window glass for the vehicle is mounted to the door panel, the molding lower part may be mounted to the door panel with a belt molding attached to the door panel interposed therebetween, and the plate-shaped member may be configured to abut a lower end of the belt molding in the vertical direction inside the door panel.

In the above window glass for a vehicle, when the window glass for the vehicle is mounted to the door panel, the molding lower part may be mounted to the door panel with a belt molding attached to the door panel interposed therebetween, the plate-shaped member positioned on the side closest to the front of the vehicle in the front-rear direction may be configured to be spaced apart from a lower end of the belt molding in the vertical direction inside the door panel, and in the front-rear direction of the vehicle, a plate-shaped member positioned on a rear side of the plate-shaped member positioned on the side closest to the front of the vehicle in the front-rear direction may be configured to abut the lower end of the belt molding in the vertical direction inside the door panel.

In the above window glass for a vehicle, a surface pressure when the plate-shaped member abuts the vertical lower end of the belt molding in the vertical direction may be 1 to 10 (N/100 mm$^2$).

In the above window glass for a vehicle, the plate-shaped member may have an angle of 0 to 45 degrees with respect to the vertical direction.

In the above window glass for a vehicle, the molding made of a resin and the plate-shaped member may be integrally molded.

In the above window glass for a vehicle, the glass plate, the molding made of the resin, and the plate-shaped member may be integrally molded.

According to the present disclosure, it is possible to provide a window glass for a vehicle capable of suppressing, at a low cost, generation of an abnormal noise caused by wind entering a gap formed at a part where a glass plate with a resin frame is mounted to a door panel.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment of the present disclosure will now be described with reference to the drawings.

Figure 1:
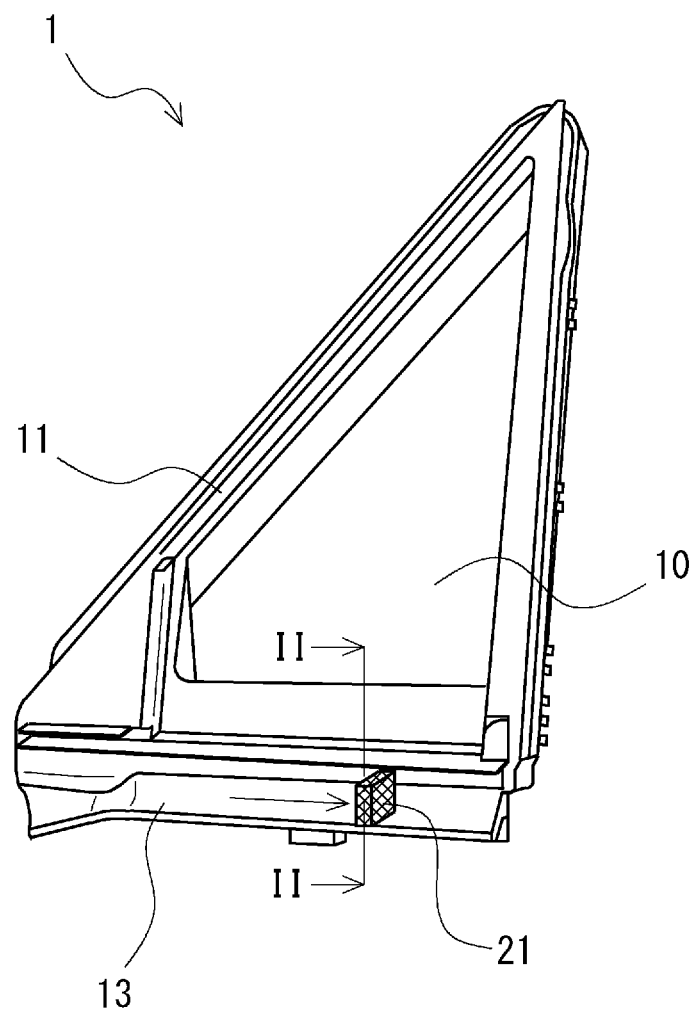
FIG. 1 is a perspective view for explaining a window glass for a vehicle according to an embodiment.

FIG. 1 is a perspective view for explaining a window glass for a vehicle according to the embodiment. As shown in FIG. 1, a window glass 1 for a vehicle according to this embodiment includes a glass plate 10 and a molding 11 made of a resin provided at a peripheral edge of the glass plate 10. Such a glass plate with a resin frame is also referred to as MAW (Module Assy Window: registered trademark). The window glass 1 for a vehicle according to this embodiment is a window glass for a vehicle used for a fixed window of a vehicle, and is suitably used for a fixed window such as a front quarter glass or a rear quarter glass of a vehicle.

In the window glass 1 for a vehicle shown in FIG. 1, the glass plate 10 is formed in a substantially triangular shape in a plan view. However, the shape of the glass plate 10 is not limited to a substantially triangular shape, but may instead be a substantially square shape or the like. The glass plate 10 may be inorganic glass or organic glass. As the inorganic glass, for example, soda lime glass, aluminosilicate glass, borosilicate glass, alkali-free glass, quartz glass or the like is used without any particular limitation. Among these kinds of glass, soda lime glass is particularly preferable in view of manufacturing cost and moldability. The method of forming the glass plate 10 is not particularly limited. For example, in the case of inorganic glass, a glass plate formed by a float method or the like is preferable.

When the glass plate 10 is inorganic glass, the glass plate 10 may be either untempered glass or tempered glass. The untempered glass is formed by molding molten glass into a plate shape and slowly cooling it. The tempered glass is formed by forming a compressive stress layer on a surface of the untempered glass, and can be either air-cooled tempered glass or chemically tempered glass.

When the tempered glass is physically tempered glass (e.g., air-cooled tempered glass), the glass surface may be tempered by an operation other than slow cooling such as quenching a glass plate heated uniformly in bending from a temperature near a softening point to generate a compressive stress layer on the glass surface by a difference between a temperature of the glass surface and that of the inside of the glass. When the tempered glass is chemically tempered glass, the glass surface may be tempered by generating compressive stress on the glass surface by an ion exchange method or the like after bending. Glass absorbing ultraviolet rays or infrared rays may be used as the glass plate 10. The glass plate 10 is preferably transparent, but may instead be a glass plate colored so as not to impair transparency.

The glass plate 10 may have a curved shape such that an outer side of the vehicle is projected when mounted to the vehicle. The glass plate 10 may have a single bent shape formed by bending the glass plate 10 in only one direction, or may have a double bent shape formed by bending the glass plate 10 in two directions (e.g., in a predetermined direction and a direction orthogonal to the predetermined direction). Gravity molding, press molding, or roller molding is used for bending the glass plate 10. When the glass plate 10 is bent to a predetermined curvature, a radius of curvature of the glass plate 10 may be 1000 to 100,000 mm.

The glass plate 10 may be one glass plate or, for example, laminated glass in which two or more glass plates are bonded with an intermediate film therebetween. As an example, a known thermoplastic resin film made of polyvinyl butyral (PVB) or ethylene vinyl acetate copolymer resin (EVA) is used as the intermediate film of the laminated glass. The intermediate film of the laminated glass may be transparent or colored. The intermediate film may have two or more layers.

When the glass plate 10 is laminated glass, the thickness of the glass positioned outside when the glass plate 10 is mounted to the vehicle may be the same as or different from the thickness of the glass positioned inside the vehicle. When the glass plate 10 is mounted to the vehicle, the thickness of the glass positioned outside is preferably 1.0 mm or more and 3.0 mm or less. When the thickness of the glass plate positioned outside the vehicle is 1.0 mm or more, the strength such as the stepping-stone resistance is sufficient, while when it is 3.0 mm or less, the mass of the laminated glass does not become excessively large, and it is preferable in view of the fuel consumption of the vehicle. The thickness of the glass plate disposed inside the vehicle is preferably 0.3 mm or more and 2.3 mm or less. If the thickness of the glass plate positioned inside the vehicle is 0.3 mm or more, handling performance is improved, while when the thickness thereof is 2.3 mm or less, the mass thereof does not become excessively large. If the thickness of the glass positioned outside the vehicle and the thickness of the glass positioned inside the vehicle are 1.8 mm or less, it is possible to achieve both a reduction of the weight and sound insulation property of the glass plate 10, which is preferable. If the glass positioned inside the vehicle has a thickness of 1.0 mm or less, the glass may be chemically tempered glass. When the glass positioned inside the vehicle is chemically tempered glass, a compressive stress value of the glass surface is preferably 300 MPa or more and the depth of the compressive stress layer is preferably 2 μm or more.

When the glass plate 10 is one sheet of a glass plate, the glass plate 10 is preferably air-cooled tempered glass, and in this case, the thickness of the glass plate 10 is preferably 1.0 mm or more and 5.0 mm or less.

When the glass plate 10 is made of organic glass, a transparent resin such as polycarbonate or acrylic resin (e.g., polymethyl methacrylate) may be used as the material of the organic glass.

The glass plate 10 may include a shielding layer on the periphery of the surface on the inside of the vehicle. The shielding layer is formed, for example, by applying a ceramic color paste including a melting glass frit containing a black pigment and then burning it. This can prevent an adhesive or the like applied to the glass plate 10 from being deteriorated by ultraviolet rays. In the glass plate 10, various suitable films may be formed on the main surface of the glass plate 10 in view of enhancing weather resistance and functionality such as hydrophilicity and water repellency.

The resin molding 11 is provided so as to surround the periphery of the glass plate 10 as an example. Examples of the material of the molding 11 include synthetic resins such as polyvinyl chloride (PVC) and thermoplastic elastomer (TPE). The molding 11 may be provided around the glass plate 10 by mounting the glass plate 10 to a mold having a cavity corresponding to the shape of the molding 11 and injecting the above-mentioned synthetic resin (molten synthetic resin) into the cavity. The molding 11 made of a resin formed separately from the glass plate 10 may be fitted to the outer periphery of the glass plate 10.

Note that the shape of the window glass 1 for a vehicle shown in FIG. 1 is only an example, and in this embodiment, the window glass 1 for a vehicle may have a shape other than the window glass for a vehicle shown in FIG. 1.

Figure 2:
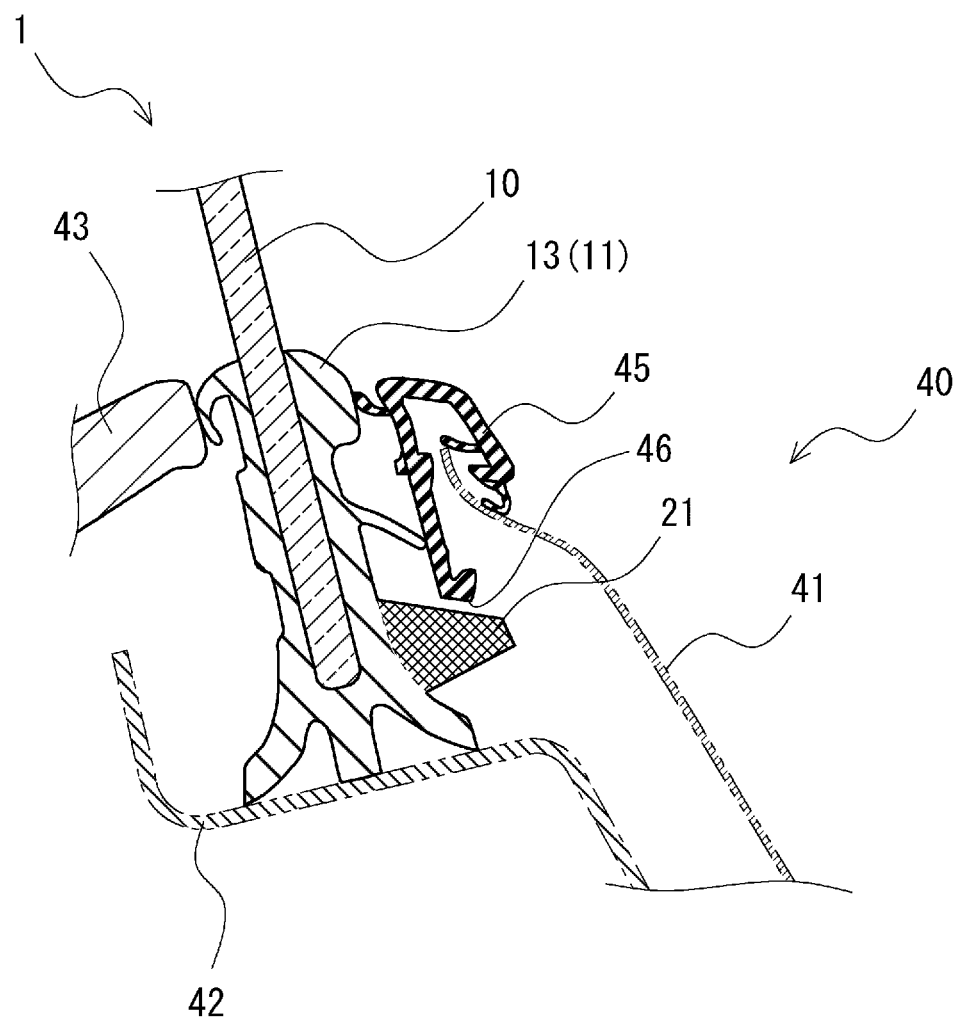
FIG. 2 is a cross-sectional view for explaining the window glass for a vehicle according to the embodiment.

FIG. 2 is a cross-sectional view for explaining the window glass for a vehicle according to this embodiment. The cross-sectional view shown in FIG. 2 corresponds to the cross-sectional view obtained by cutting the window glass 1 for a vehicle at the cutting line II-II in FIG. 1, and is a cross-sectional view seen from the front side of the vehicle. In the cross-sectional view shown in FIG. 2, the window glass 1 for a vehicle is mounted to the door panel 40.

As shown in FIG. 2, the molding lower part 13 of the molding 11, which is disposed on a lower side of the window glass 1 for a vehicle, is disposed inside the door panel 40 when the window glass 1 for a vehicle is mounted to the door panel 40. At this time, the molding lower part 13 is mounted to the door panel 40 with a belt molding 45 attached to the door panel 40 interposed therebetween.

Specifically, as shown in FIG. 2, the door panel 40 includes an outer panel 41, an inner panel 42, a door trim 43, and the belt molding 45. A lower end of the molding 11 (the lower end of the molding lower part 13) of the window glass 1 for a vehicle is disposed so as to abut the upper surface of the inner panel 42. A side surface of the molding lower part 13 on the inside of the vehicle is disposed so as to abut the door trim 43. The outer panel 41 is disposed outside the vehicle, and the belt molding 45 is disposed between the molding lower part 13 and the outer panel 41.

Figure 9:
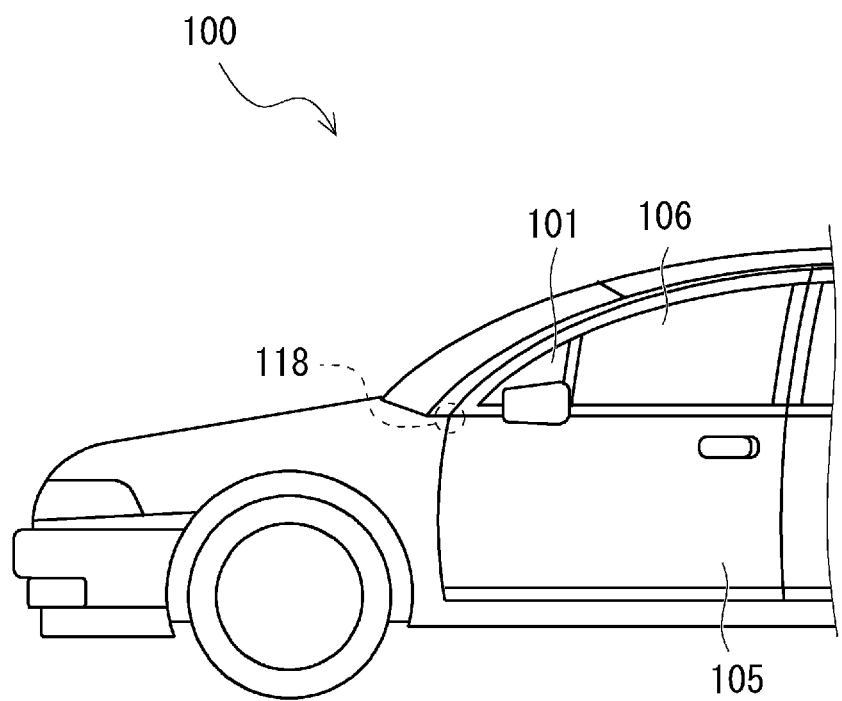
FIG. 9 is a side view for explaining an issue to be solved by the present disclosure.
Figure 10:
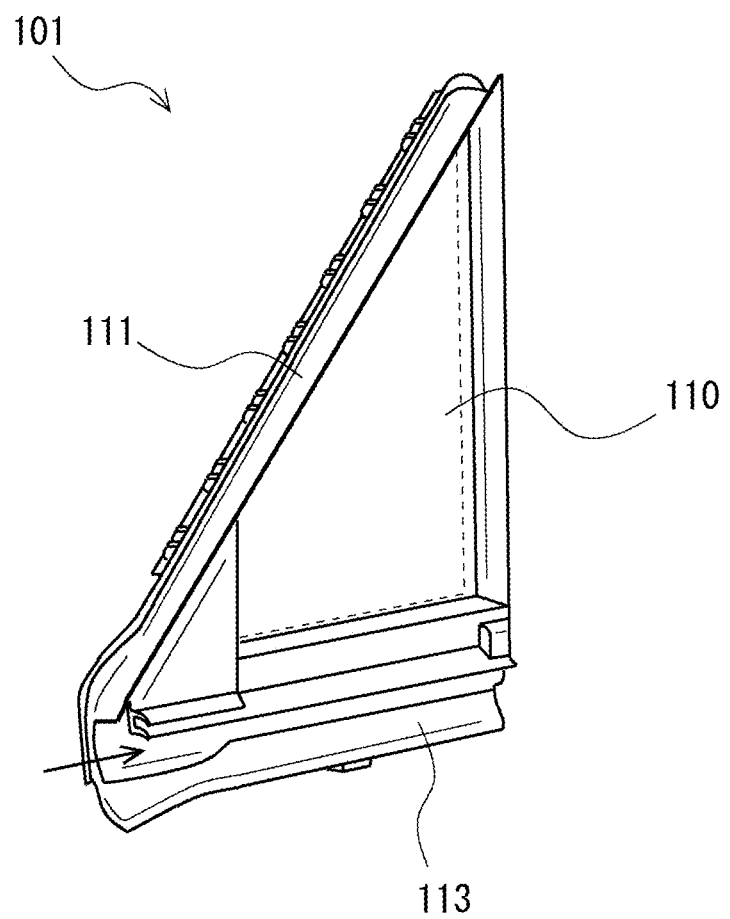
FIG. 10 is a perspective view for explaining a window glass for a vehicle according to related art.
Figure 11:
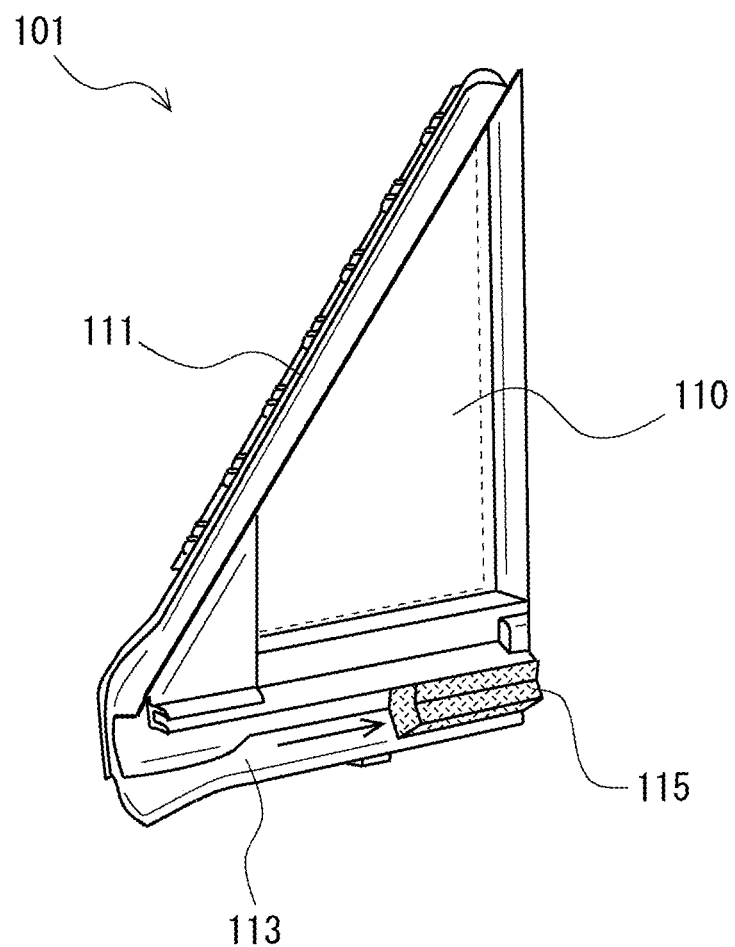
FIG. 11 is a perspective view for explaining the window glass for a vehicle according to the related art.

As described above, when the window glass 1 for a vehicle (the front quarter glass) is mounted to the door panel 40, there may be a gap at a part where the window glass 1 for a vehicle is mounted to the door panel 40 (see reference numeral 118 in FIG. 9). In this manner, when the gap (see reference numeral 118 in FIG. 9) is formed at a part where the window glass 1 for a vehicle is mounted to the door panel 40, wind enters through this gap while the vehicle is traveling. The entered wind passes through the molding lower part 13 of the window glass 1 for a vehicle and enters inside the door panel 40. If wind enters inside the door panel 40 in this way, there is a problem that an abnormal noise is generated due to the entered wind.

In this embodiment, the molding lower part 13 disposed inside the door panel 40 is provided with a plate-shaped member 21 projecting toward the outside of the vehicle so as to be able to attenuate or block the wind (indicated by an arrow in FIG. 1) entering inside the door panel 40 while the vehicle is traveling. That is, as shown in FIG. 2, the plate-shaped member 21 attenuates or blocks wind entering a hollow space between the molding lower part 13 disposed inside the door panel 40 and the outer panel 41, which is the outer door panel. In this embodiment, since the plate-shaped member 21 is provided as described above, the wind entering inside the door panel 40 can be attenuated or blocked, and the generation of an abnormal noise can be suppressed. For example, the plate-shaped member 21 may be provided so as to be substantially perpendicular to the direction of the entering wind, that is, the front-rear direction of the vehicle (the direction in which the vehicle travels). In addition, the plate-shaped member 21 may have an angle to follow the trajectory of the molding lower part 13 when the molding lower part 13 is inserted into the door panel 40. In this case, this angle may be an angle rotated by a predetermined angle about the rotation axis in the height direction of the vehicle.

As shown in FIG. 2, the plate-shaped member 21 may be configured to be spaced apart from a lower end 46 of the belt molding 45 in the vertical direction. The plate-shaped member 21 may be configured to abut the lower end 46 of the belt molding in the vertical direction. When the plate-shaped member 21 is configured to abut the lower end 46 of the belt molding in the vertical direction, the wind entering inside the door panel 40 can be more reliably attenuated or blocked. For example, the surface pressure of the plate-shaped member 21 that abuts the lower end 46 of the belt molding 45 in the vertical direction may be 1 to 10 (N/100 mm$^2$), preferably 3 to 5 (N/100 mm$^2$). When the plate-shaped member 21 abuts the lower end 46 of the belt molding, the plate-shaped member 21 may be curved to adjust the surface pressure of the plate-shaped member 21 abutting the lower end 46 of the belt molding 45.

The plate-shaped member 21 can be formed of a resin. For example, the plate-shaped member 21 may be an integrally molded product integrally molded with the resin molding 11. That is, by integrally molding the glass plate 10 and the resin molding 11 by injection molding using a mold having a shape corresponding to the plate-shaped member 21, the molding 11 having the plate-shaped member 21 can be formed. For example, the glass plate 10 and the plate-shaped member 21 may be disposed between upper and lower molds of a molding die, a cavity space formed by the upper and lower molds may be filled with a molten resin material, and the resin material may be solidified to form the window glass 1 for a vehicle including the plate-shaped member 21. The window glass 1 for a vehicle may be an integrally molded product composed of the glass plate 10, the resin molding 11, and a plate-shaped member 21.

In this embodiment, since the plate-shaped member 21 is provided at the resin molding 11 as described above, the plate-shaped member 21 can be formed at a low cost. In particular, when the resin molding 11 and the plate-shaped member 21 are integrally molded, the plate-shaped member 21 can be formed at a low cost. Therefore, according to the disclosure of this embodiment, it is possible to provide a window glass for a vehicle capable of suppressing, at a low cost, generation of an abnormal noise caused by wind entering a gap formed at a part where a glass plate with a resin frame is mounted to a door panel.

Figure 3:
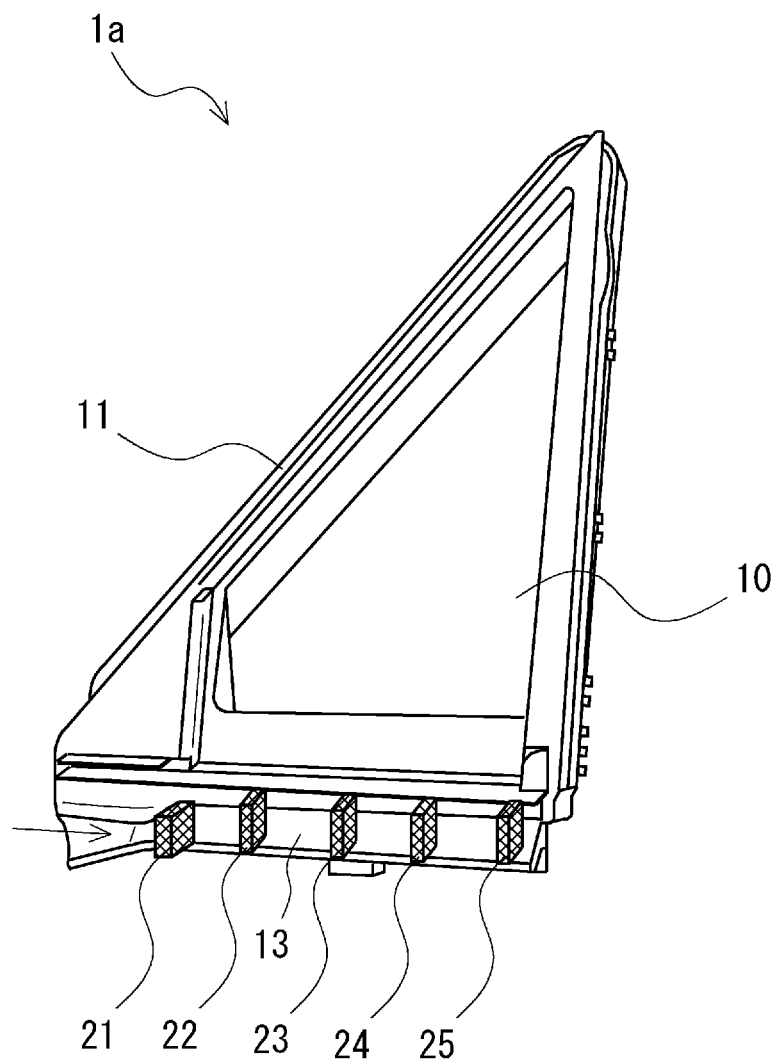
FIG. 3 is a perspective view for explaining the window glass for a vehicle according to the embodiment.

FIG. 3 is a perspective view for explaining the window glass for a vehicle according to this embodiment. As shown in FIG. 3, in this embodiment, a plurality of plate-shaped members 21 to 25 may be provided at the molding lower part 13 disposed on a lower side of the window glass 1a for a vehicle. The plurality of plate-shaped members 21 to 25 are arranged in such a way that they are aligned from the upstream side (from the front side of the vehicle in the front-rear direction) to the downstream side (to the rear side of the vehicle in the front-rear direction) of the wind entering while the vehicle is traveling. When the plurality of plate-shaped members 21 to 25 are provided as described above, the wind entering inside the door panel 40 can be more reliably attenuated or blocked, and the occurrence of an abnormal noise can be more effectively suppressed. The thicknesses of the plate-shaped members 21 to 25 may be 0.5 mm or more and 8.0 mm or less.

At this time, the rigidity of the plate-shaped member 21, which is positioned on the most upstream side of the wind entering while the vehicle is traveling, may be higher than the rigidity of the plate-shaped members 22 to 25, which are positioned on the downstream side of the plate-shaped member 21 positioned on the most upstream side. In other words, the rigidity of the plate-shaped member 21 positioned on a side closest to the front in the front-rear direction of the vehicle may be higher than that of the plate-shaped members 22 to 25 positioned on a rear side of the plate-shaped member 21 in the front-rear direction of the vehicle. In such a configuration, the most powerful wind can be received by the plate-shaped member 21 having high rigidity, and after that, the attenuated wind can be further attenuated or blocked by the second and subsequent plate-shaped members 22 to 25.

For example, by increasing the thickness of the plate-shaped member 21 to be larger than those of the plate-shaped members 22 to 25, the rigidity of the plate-shaped member 21 can be made higher than that of the plate-shaped members 22 to 25. For example, the thickness of the plate-shaped member 21 may be 3.0 mm or more and 8.0 mm or less, and the thicknesses of the plate-shaped members 22 to 25 may be 0.5 mm or more and 5.0 mm or less.

Further, a material having higher rigidity than that of the material constituting the plate-shaped members 22 to 25 may be used as the material constituting the plate-shaped member 21. In this case, for example, the glass plate 10, the plate-shaped member 21 having high rigidity, and the plate-shaped members 22 to 25 having lower rigidity than that of the plate-shaped member 21 are disposed between the upper and lower molds of the molding die. The cavity space formed by the upper mold and the lower mold is filled with a molten resin material and then the resin material is solidified. In this way, the resin molding 11 having the high rigid plate-shaped member 21 and the low rigid plate-shaped members 22 to 25 can be integrally molded. That is, the window glass 1a for a vehicle may be an integrally molded product in which the glass plate 10, the resin molding 11, the plate-shaped member 21 having high rigidity, and the plate-shaped members 22 to 25 having low rigidity are integrally molded. The window glass 1a for a vehicle may be a two-color molded product in which the resin molding 11 is integrally molded by injection molding on the glass plate 10, and then the plate-shaped member 21 having high rigidity and the plate-shaped members 22 to 25 having low rigidity are molded.

Figure 4:
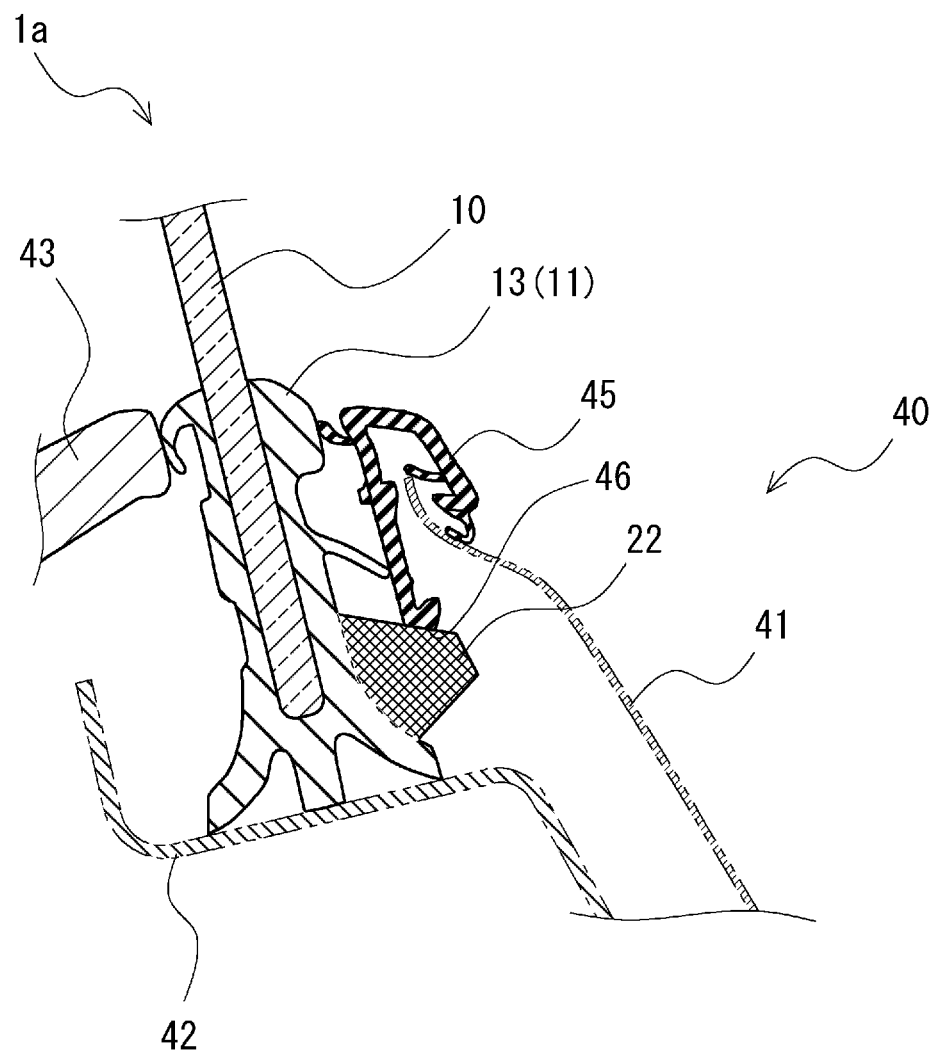
FIG. 4 is a cross-sectional view for explaining the window glass for a vehicle according to the embodiment.

In the window glass 1a for a vehicle shown in FIG. 3, the plate-shaped member 21 positioned on the most upstream side (the side closest to the front in the front-rear direction of the vehicle) may be spaced apart from the lower end 46 of the belt molding 45 in the vertical direction (see FIG. 2). Further, the plate-shaped members 22 to 25 on the downstream side (on the rear side of the plate-shaped member 21 which is positioned on the side closest to the front in the front-rear direction of the vehicle) may be configured to abut the lower end 46 of the belt molding 45 in the vertical direction (see FIG. 4). When the plate-shaped members 22 to 25 abut the lower end 46 of the belt molding, the plate-shaped members 22 to 25 may be curved to adjust the surface pressure of the plate-shaped members 22 to 25 abutting the lower end 46 of the belt molding 45. Although FIG. 4 shows a case where the plate-shaped member 22 abuts the belt molding 45, the other plate-shaped members 23 to 25 also abut the belt molding 45 in a manner similar to the plate-shaped member 22.

That is, the rigidity of the plate-shaped member 21 positioned on the most upstream side is higher than that of the other plate-shaped members 22 to 25. Therefore, when the plate-shaped member 21 having high rigidity abuts the lower end 46 of the belt molding 45, the belt molding 45 may be deformed or the like. For this reason, it is preferable that the plate-shaped member 21 positioned on the most upstream side be configured to be spaced apart from the lower end 46 of the belt molding 45.

On the other hand, since the rigidity of the plate-shaped members 22 to 25 on the downstream side is lower than that of the plate-shaped member 21, even if the plate-shaped members 22 to 25 having low rigidity abut the lower end 46 of the belt molding 45, it is possible to suppress the belt molding 45 from being largely deformed or the like. When the plate-shaped members 22 to 25 are configured to abut the lower end 46 of the belt molding 45, a gap between the plate-shaped members 22 to 25 and the belt molding 45 can be reduced, and the wind entering the inside of the door panel 40 can be more reliably attenuated or blocked. That is, the plate-shaped member 21 having high rigidity functions as a plate-shaped member (for attenuating) for reducing the air volume, and the plate-shaped members 22 to 25 having low rigidity function as plate-shaped members (for sealing) for reducing the sound directed to the inside of the vehicle.

For example, the surface pressure of the plate-shaped members 22 to 25 abutting the lower end 46 of the belt molding 45 in the vertical direction is 1 to 10 (N/100 $mm^2$), preferably 3 to 5 (N/100 $mm^2$). The thicknesses of the plate-shaped members 21 to 25 (i.e., the thicknesses thereof in the front-rear direction of the vehicle) are 0.5 mm to 8 mm, preferably 1 mm to 3 mm. At this time, the thickness of the plate-shaped member 21 may be made larger than the thicknesses of the plate-shaped members 22 to 25, so that the rigidity of the plate-shaped member 21 may become higher than the rigidity of the plate-shaped members 22 to 25.

Figure 5:
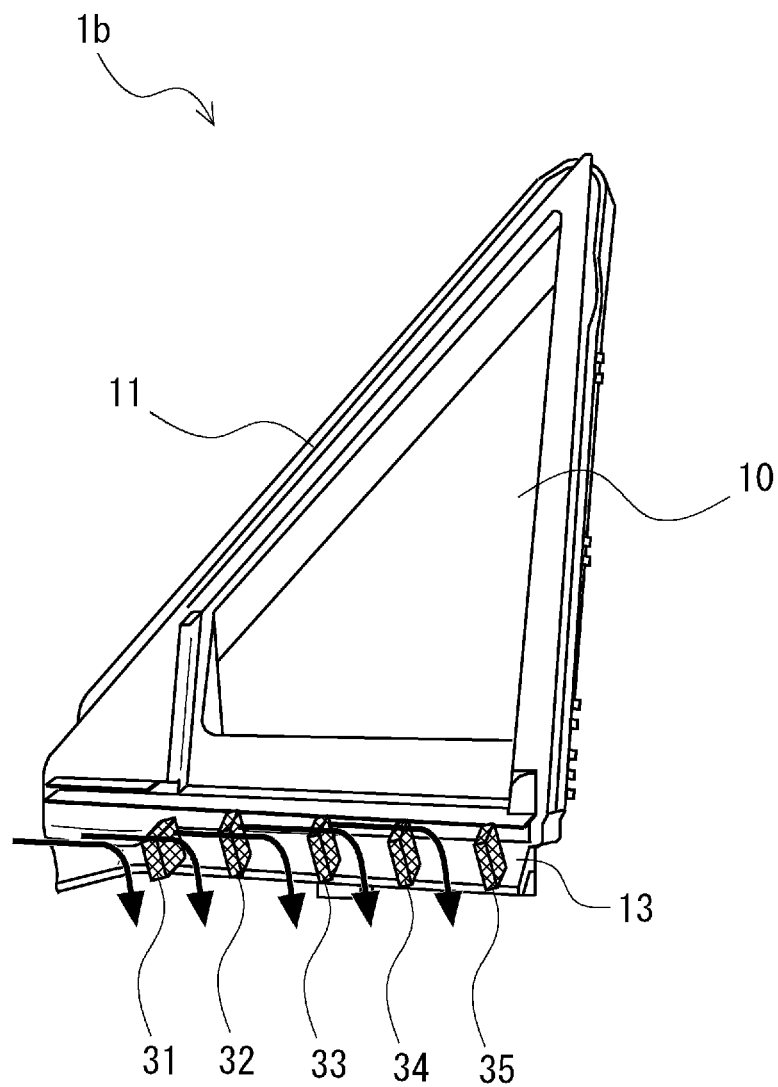
FIG. 5 is a perspective view for explaining the window glass for a vehicle according to the embodiment.

FIG. 5 is a perspective view for explaining the window glass for a vehicle according to this embodiment. In the configuration shown in FIG. 5, a plurality of plate-shaped members 31 to 35 are provided at the molding lower part 13 disposed on a lower side of the window glass 1*b* for a vehicle. In the window glass 1*b* for a vehicle shown in FIG. 5, each of the plate-shaped members 31 to 35 is configured to have an angle of 0 to 45 degrees with respect to the vertical direction so that when wind entering while the vehicle is traveling collides with the vehicle, the colliding wind is directed to the lower side of the vehicle (see arrows in FIG. 5). With such a configuration, it is possible to actively guide the entered wind toward the downward direction of the vehicle, and it is possible to effectively suppress the transmission of an abnormal noise to passengers in the vehicle. The other configurations of the plate-shaped members 31 to 35 are the same as those of the plate-shaped members 21 to 25 shown in FIG. 3.

FIGS. 3 and 5 show configuration examples in which five plate-shaped members 21 to 25 and 31 to 35 are provided, respectively. However, in this embodiment, the number of plate-shaped members provided on the window glass for a vehicle is not limited to five, and may be determined in any way.

Figure 6:
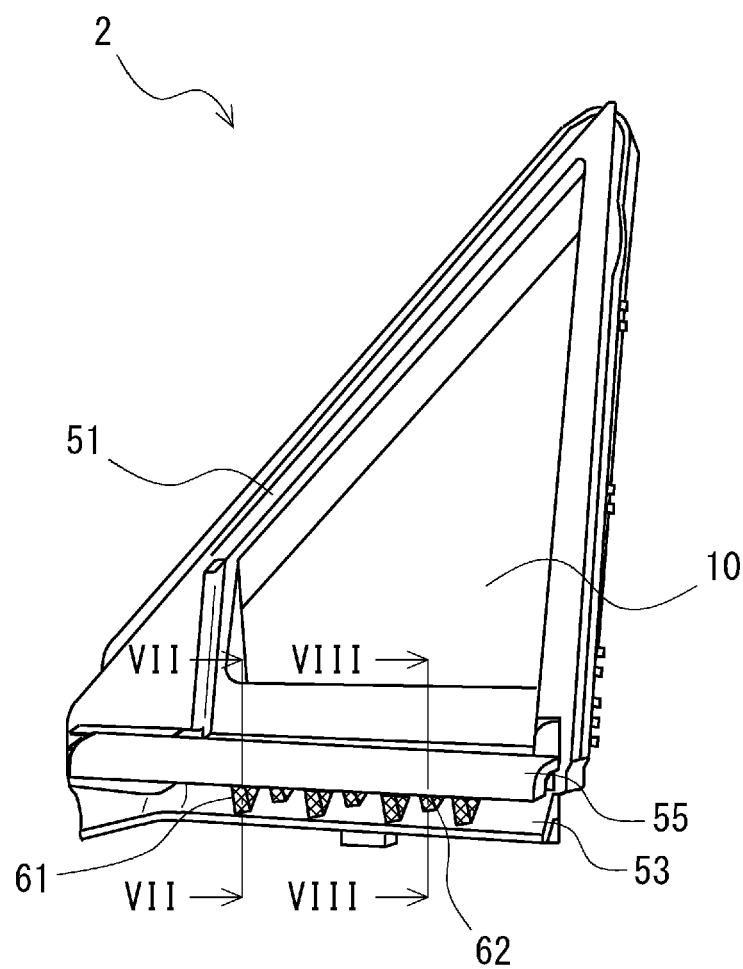
FIG. 6 is a perspective view for explaining another configuration example of the window glass for a vehicle according to the embodiment.
Figure 7:
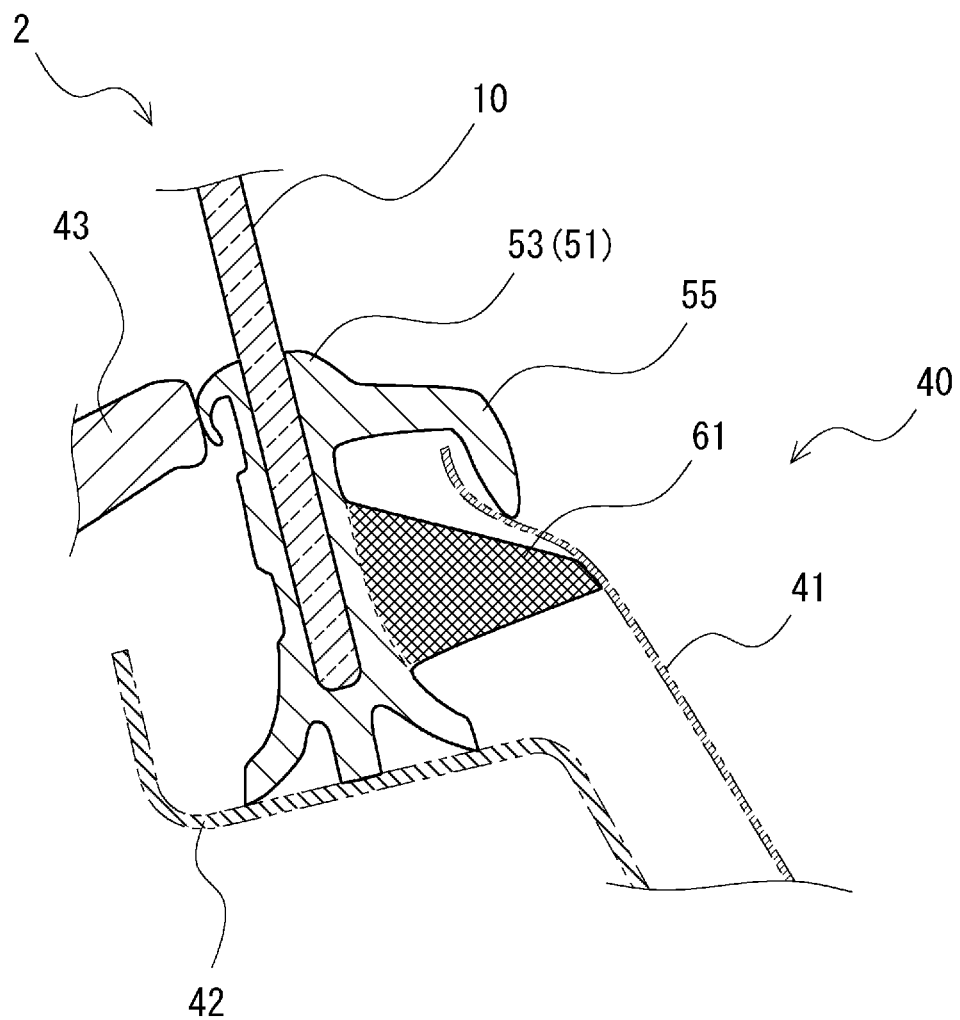
FIG. 7 is a cross-sectional view for explaining another configuration example of the window glass for a vehicle according to the embodiment.
Figure 8:
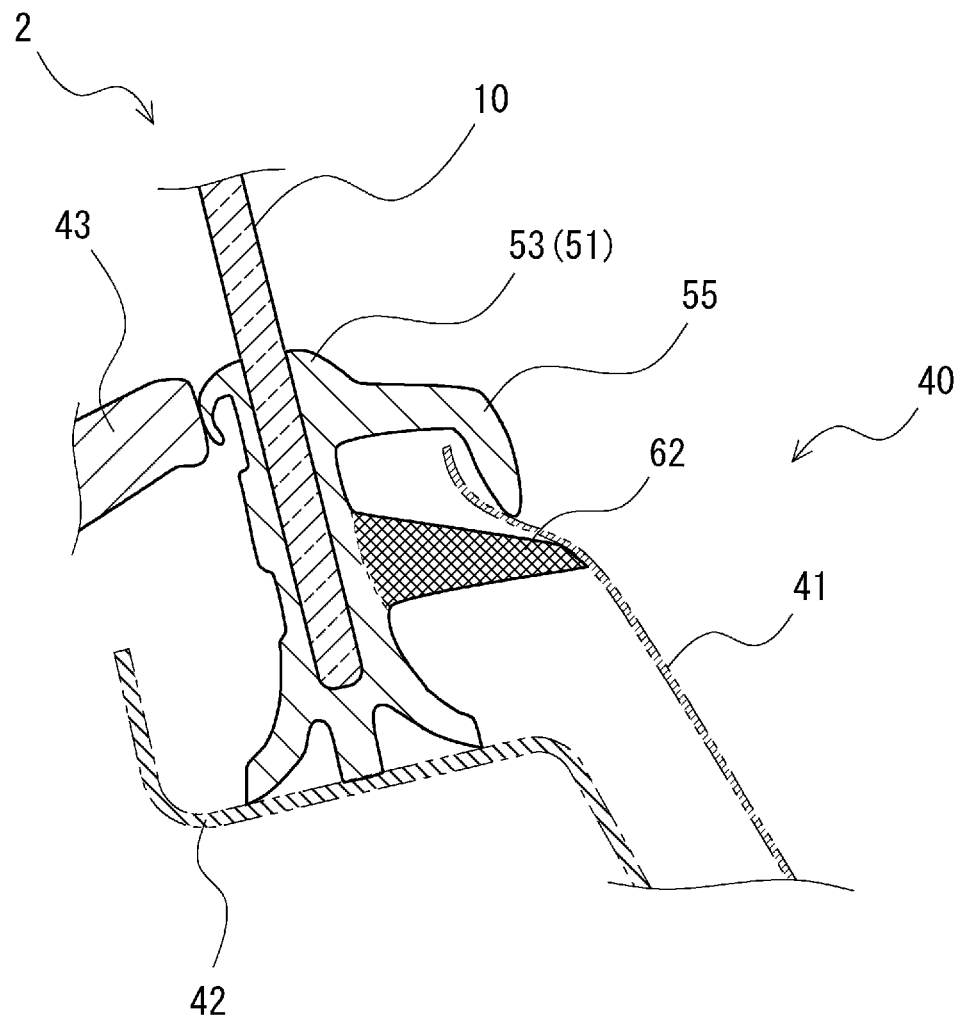
FIG. 8 is a cross-sectional view for explaining another configuration example of the window glass for a vehicle according to the embodiment.

Next, another configuration example of the window glass for a vehicle according to this embodiment will be described. FIGS. 6 to 8 are perspective views and cross-sectional views for explaining another configuration example of the window glass for a vehicle according to this embodiment. In FIGS. 1 to 5, an example of a configuration in which the window glass 1 for a vehicle is mounted to the door panel 40 with the belt molding 45 interposed therebetween is described. However, in FIGS. 6 to 8, an example of a configuration in which the window glass for a vehicle is mounted to the door panel 40 without using the belt molding 45 is described.

A window glass 2 for a vehicle shown in FIG. 6 includes a glass plate 10 and a molding 51 made of a resin provided at a peripheral edge of the glass plate 10. Plate-shaped members 61 and 62 are provided on a molding lower part 53 in the molding 51 disposed on a lower side of the window glass 2 for a vehicle. An extended part 55 extending from the molding lower part 53 to the outside of the vehicle is provided on the outside of the molding lower part 53 of the window glass 2 for a vehicle. The extended part 55 is formed integrally with the molding 51 made of a resin.

FIGS. 7 and 8 are cross-sectional views obtained by cutting the window glass 2 for a vehicle at the cutting lines VII-VII and VIII-VIII of FIG. 6, respectively, and are cross-sectional views seen from the front side of the vehicle. In the cross-sectional views shown in FIGS. 7 and 8, the window glass 2 for a vehicle is mounted to the door panel 40.

As shown in FIGS. 7 and 8, the molding lower part 53 disposed on a lower side of the window glass 2 for a vehicle is disposed inside the door panel 40 when the window glass 2 for a vehicle is mounted to the door panel 40. Specifically, as shown in FIGS. 7 and 8, the door panel 40 includes an outer panel 41, an inner panel 42, and a door trim 43. A lower end of the molding 51 (the lower end of the molding lower part 53) of the window glass 2 for a vehicle is disposed so as to abut the upper surface of the inner panel 42. A side surface of the molding lower part 53 on the inside of the vehicle is disposed so as to abut the door trim 43. The outer panel 41 is arranged on the outside of the vehicle.

In the configuration example shown in FIGS. 7 and 8, the extended part 55 of the molding lower part 53 is extended to the outside of the vehicle to cover an upper end of the door panel 40 (the outer panel 41). With such a configuration, the upper end of the door panel 40 can be hidden, thereby improving the design property. Since the window glass 2 for a vehicle can be mounted to the door panel 40 without using a belt molding, the number of parts can be reduced.

Also in the configuration example shown in FIGS. 7 and 8, the plate-shaped members 61 and 62 are provided at the molding lower part 53 disposed inside the door panel 40. The plate-shaped members 61 and 62 are formed so as to project from the molding lower part 53 to the outside of the vehicle. In the configuration example shown in FIGS. 7 and 8, ends of the plate-shaped members 61 and 62 on the outside of the vehicle are formed so as to abut the outer panel 41. The length of the plate-shaped member 61 in the vertical direction shown in FIG. 7 is shorter than the length of the plate-shaped member 62 in the vertical direction shown in FIG. 8. In other words, the area of the plate-shaped member 61 shown in FIG. 7 is larger than the area of the plate-shaped member 62 shown in FIG. 8.

In the configuration example shown in FIG. 6, the plate-shaped member 61 having a large area and the plate-shaped member 62 having a small area are alternately arranged from the front to the rear of the vehicle. However, the arrangement of the plate-shaped members 61 and 62 is not limited to this arrangement and may be any arrangement.

Also in the configuration shown in FIGS. 6 to 8, the plate-shaped members 61 and 62 attenuate or block the wind entering the hollow space between the molding lower part 53 disposed inside the door panel 40 and the outer panel 41, which is the outer door panel. Therefore, it is possible to suppress the generation of an abnormal noise caused by the wind penetrating into the gap formed at the position where the glass plate with the resin frame is mounted to the door panel. Also in this embodiment, since the plate-shaped members 61 and 62 are provided on the resin molding 51, the plate-shaped members 61 and 62 can be formed at a low cost. Therefore, it is possible to provide a window glass for a vehicle capable of suppressing, at a low cost, generation of an abnormal noise caused by wind entering a gap formed at a part where a glass plate with a resin frame is mounted to a door panel.

In the configuration example shown in FIGS. 6 to 8, the molding 51 may be provided around the glass plate 10 by attaching the glass plate 10 to a mold having a cavity corresponding to the shape of the molding 51 and injecting the above-mentioned synthetic resin (molten synthetic resin) into the cavity. The molding 51 made of a resin formed separately from the glass plate 10 may be fitted to the outer periphery of the glass plate 10.

The configurations of the window glass 2 for a vehicle shown in FIGS. 6 to 8 other than the above are the same as those of the window glass for a vehicle shown in FIGS. 1 to 5, and therefore the description thereof will be omitted.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A window glass for a vehicle used for a fixed window of the vehicle comprising:
   a glass plate; and
   a molding made of a resin provided at a peripheral edge of the glass plate, wherein
   in the molding, a molding lower part disposed on a lower side of the window glass for the vehicle is configured to be disposed on an inside of a door panel when the window glass for the vehicle is mounted to the door panel, and
   a plurality plate-shaped members projecting toward an outside of the vehicle is provided at the molding lower part,
   wherein the plurality of plate-shaped members are arranged in such a way so that plate-shaped members of the plurality of plate-shaped members are spaced apart from each other in a direction from a front side to a rear side of the vehicle;
   a plurality of the plate-shaped members are provided in a hollow space between the molding lower part and an outer panel positioned on the outside of the door panel; and
   from among the plurality of plate-shaped members, rigidity of the plate-shaped member positioned on a side closest to the front of the vehicle in a front-rear direction is greater than rigidity of the plate-shaped member positioned on a rear side of the plate-shaped member positioned on the side closest to the front of the vehicle in the front-rear direction.

2. The window glass for a vehicle according to claim 1, wherein
   each plate-shaped member of the plurality of plate-shaped members has a thickness of 0.5 mm to 8 mm.

3. The window glass for a vehicle according to claim 1, wherein
   when the window glass for the vehicle is mounted to the door panel, the molding lower part is mounted to the door panel with a belt molding attached to the door panel interposed between the molding lower part and the door panel, and
   each plate-shaped member of the plurality of plate-shaped members is configured to be spaced apart from a lower end of the belt molding in a vertical direction inside the door panel.

4. The window glass for a vehicle according to claim 1, wherein
   when the window glass for the vehicle is mounted to the door panel, the molding lower part is mounted to the door panel with a belt molding attached to the door panel interposed between the molding lower part and the door panel, and
   each plate-shaped member of the plurality of plate-shaped members is configured to abut a lower end of the belt molding in a vertical direction inside the door panel.

5. The window glass for a vehicle according to claim 1, wherein
   when the window glass for the vehicle is mounted to the door panel, the molding lower part is mounted to the door panel with a belt molding attached to the door panel interposed between the molding lower part and the door panel,
   each plate-shaped member of the plurality of plate-shaped members positioned on the side closest to the front of the vehicle in the front-rear direction is configured to be spaced apart from a lower end of the belt molding in a vertical direction inside the door panel, and
   in the front-rear direction of the vehicle, a plate-shaped member positioned on a rear side of the plate-shaped member positioned on the side closest to the front of the vehicle in the front-rear direction is configured to abut the lower end of the belt molding in the vertical direction inside the door panel.

6. The window glass for a vehicle according to claim 4, wherein
   a surface pressure when the plate-shaped member abuts the vertical lower end of the belt molding in the vertical direction is 1 to 10 N/100 mm$^2$.

7. The window glass for a vehicle according to claim 1, wherein
   each plate-shaped member of the plurality of plate-shaped members has an angle of 0 to 45 degrees with respect to the vertical direction.

8. The window glass for a vehicle according to claim 1, wherein
   the molding made of a resin and the plurality of plate-shaped members are integrally molded.

9. The window glass for a vehicle according to claim 1, wherein
   the glass plate, the molding made of the resin, and the plurality of plate-shaped members are integrally molded.

* * * * *